(No Model.) 4 Sheets—Sheet 1.

A. V. MESEROLE.
ELECTRIC MOTOR.

No. 525,108. Patented Aug. 28, 1894.

Witnesses
T. A. Connor Jr.
Geo. M. Whitney

Inventor
Abraham V. Meserole
by Chas. L. Ewin,
Attorney (No Model.) 4 Sheets—Sheet 2.

A. V. MESEROLE.
ELECTRIC MOTOR.

No. 525,108. Patented Aug. 28, 1894.

Witnesses
T. A. Connor
Geo. M. Whitney

Inventor
Abraham V. Meserole
by Thos. L. Ewing,
Attorney.

(No Model.) 4 Sheets—Sheet 3.

A. V. MESEROLE.
ELECTRIC MOTOR.

No. 525,108. Patented Aug. 28, 1894.

Witnesses
T. A. Connor Jr.
Geo. M. Whitney

Inventor
Abraham V. Meserole
by Thos. L. Ewing,
Attorney.

THE NORRIS PETERS CO., PHOTO-LITHO., WASHINGTON, D. C.

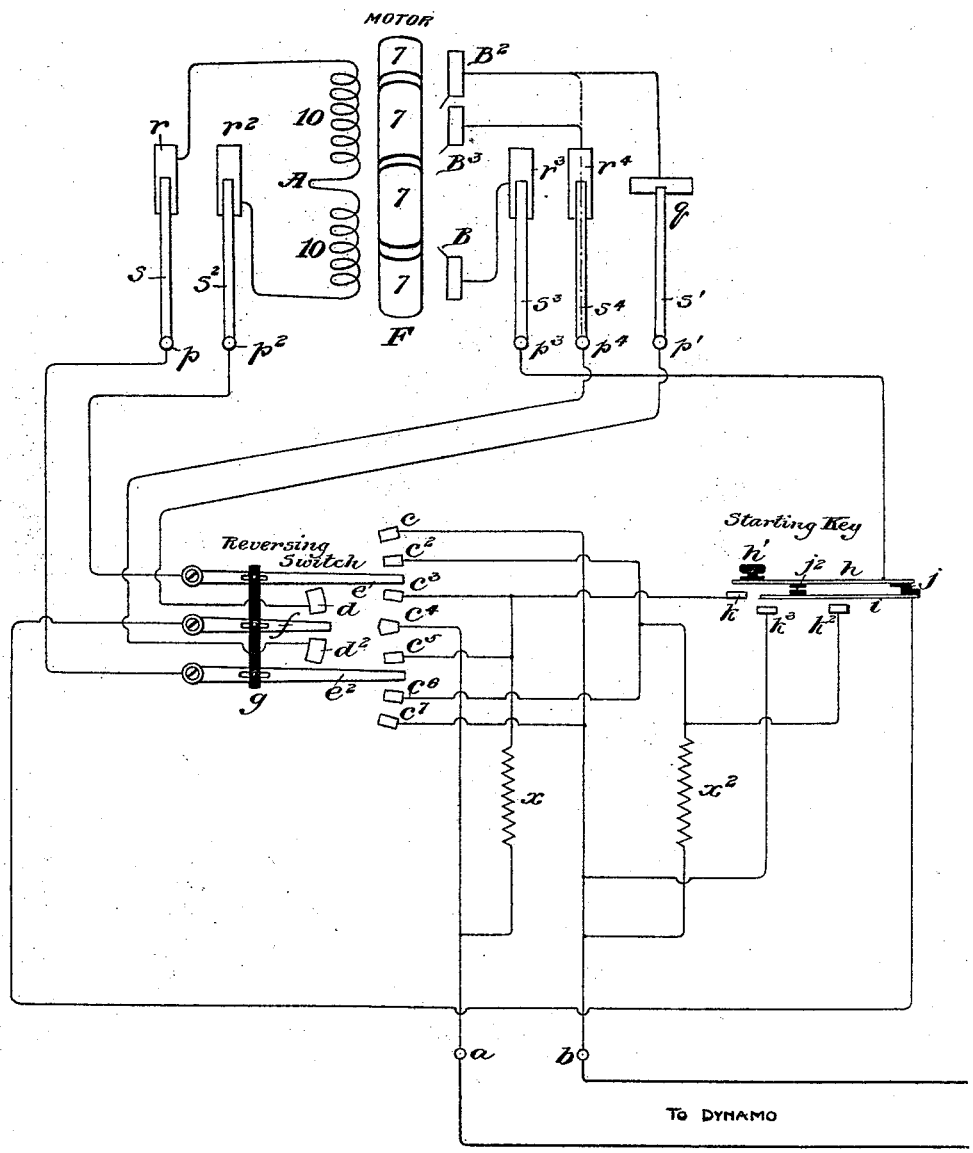

UNITED STATES PATENT OFFICE.

ABRAHAM V. MESEROLE, OF NEW YORK, N. Y.

ELECTRIC MOTOR.

SPECIFICATION forming part of Letters Patent No. 525,108, dated August 28, 1894.

Application filed January 8, 1894. Serial No. 496,161. (No model.)

*To all whom it may concern:*

Be it known that I, ABRAHAM V. MESEROLE, a citizen of the United States of America, and a resident of New York, in the State of New York, have invented a new and useful Improvement in Electric Motors, of which the following is a specification.

This invention relates to electrically controlled, variable speed, and reversible motors, and consists in certain peculiar features of construction and novel combinations of parts hereinafter set forth and claimed.

The primary object of the invention is to produce, at a moderate cost, a motor of the above class which shall be at once effective, reliable, of simple construction, and adapted for either large or small work.

The objects of the respective parts of the invention hereinafter severally claimed will be set forth in the following description, which, together with such statements of the objects of the invention, is intended to be sufficiently full, clear and exact to enable those skilled in the art to understand and practice the invention.

Four sheets of drawings accompany this specification as part thereof.

Figure 1:
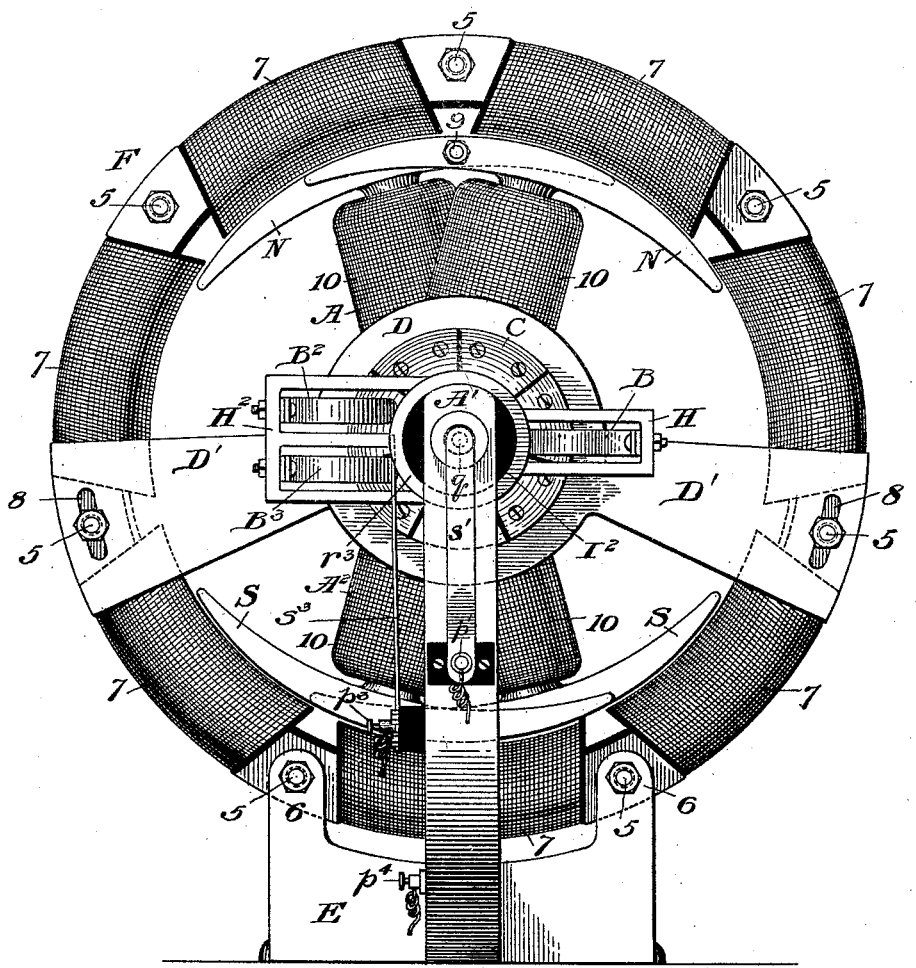
Figure 2:
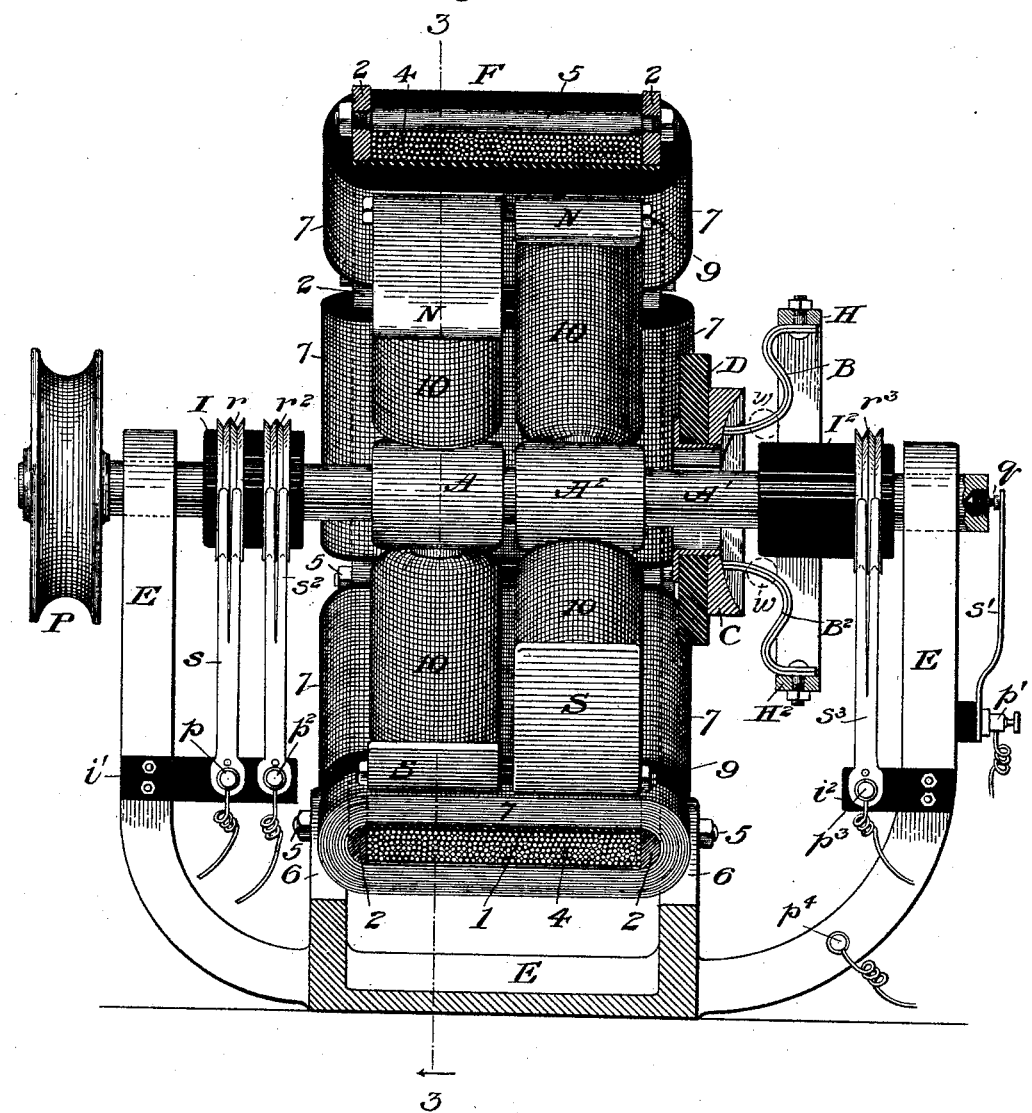
Figure 3:
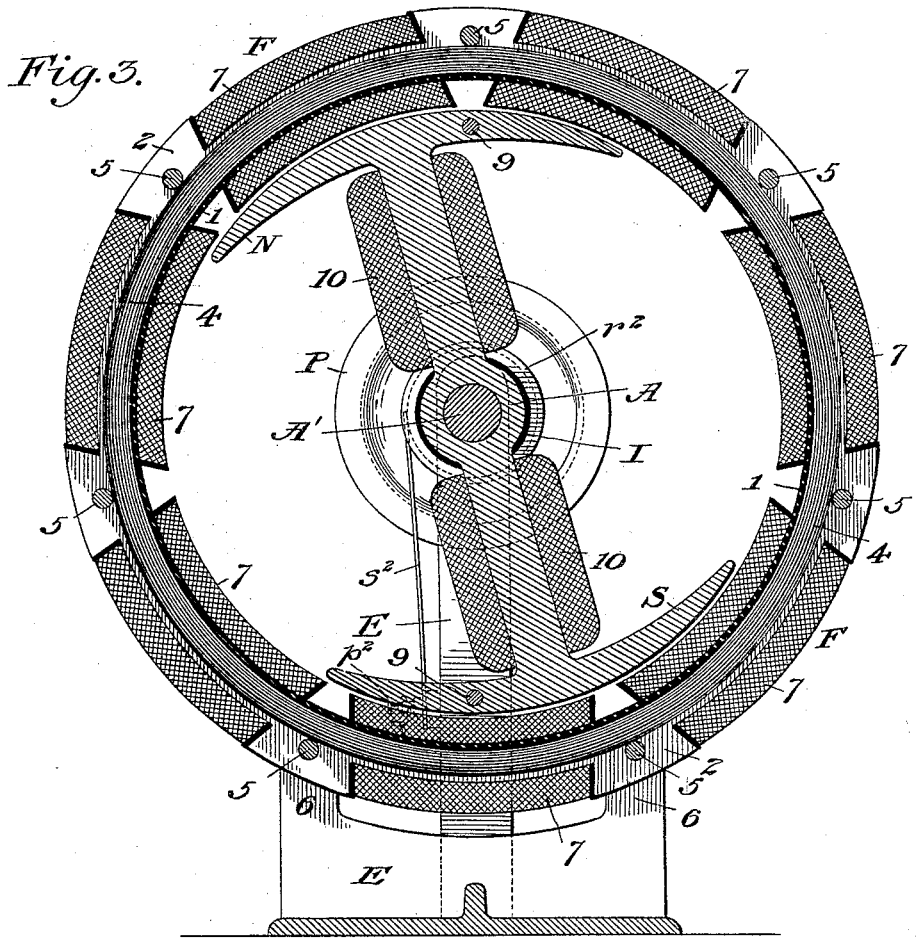
Figure 4:
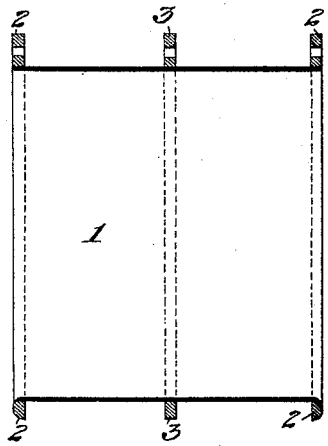

Figure 1 of the drawings is an end view of a small electric motor constructed according to the present invention. Fig. 2 is a side view of the same, partly in section, showing two brushes in the plane of section instead of the arrangement of brushes shown in Fig. 1. Fig. 3 represents a section on the line 3—3 Fig. 2. Fig. 4 represents a longitudinal section on a smaller scale through the spool of the field-core of a larger motor; and Fig. 5 is a circuit diagram illustrating the operation of the improved motor.

Like letters and numbers refer to like parts in all the figures.

The improved motor comprises a fixed drum-shaped field-ring, F, and a bipolar armature, A, $A^2$, rotating within said field-ring, supported in common by a combined bed-plate and bearings E, hereinafter termed the frame-casting, together with the remainder of the motor proper. The core of said field-ring is composed of a thin cylinder 1, of insulating material, surrounded by a pair of annular side-pieces 2, preferably of iron or inert material, together with or without one or more intermediate annular core-pieces 3, Fig. 4, similar to said side-pieces 2; these parts constituting a spool, which is wound circumferentially with insulated iron wire 4 to complete the core proper. The side-pieces, 2, are united with each other by bolts 5 which extend through external lugs on the annular core-pieces in common, outside of the circumferential wrapping or wrappings; and a pair of these bolts extended through lugs 6 on the frame-casting E serve to fixedly attach the completed field-ring to said frame-casting; said annular core-pieces 2, or 2 and 3, forming, in connection with the remainder of the circumferentially wound core, a sufficiently rigid frame for the field-ring. Between said external lugs of said annular core-pieces, and between the customary end-disks of insulating material in contact with said lugs, the field-core is provided with a sufficient number of field-coils 7, all of which are wound in one direction, and connected in series, successive coils having leads attached to the corresponding segments of a fixed disk-shaped commutator, C. Seven field-coils are shown in the drawings. Their number may be increased, or reduced to five; the object being to have an odd number and at least three coils in excess of the number of the poles of the armature. Another pair of said bolts 5 serve conveniently to attach a disk D of insulating material which supports and insulates the segments of said commutator C, and is constructed with a pair of arms, D' Fig. 1, having concentric slots 8 through which said bolts 5 extend; such slots adapting the commutator to be adjusted in a customary way, to increase the lead of the brushes in either direction.

The bipolar armature A $A^2$ is preferably constructed, as shown, in two sections, both of which are fast upon the armature-shaft A' side by side, and in the drawings are furthermore united with each other by bolts 9 parallel with the shaft. Each section conveniently supports a pair of radial coils 10, and the principal object of forming the armature in such sections is to thus readily increase the length of wire and number of convolutions to any required extent in high voltage motors. Another object is to extend the fields of force when desired by inclining the sections relatively to each other, as in the drawings. See Fig. 1. I prefer to so incline the sections for slow speed and large diameter, in order to effectively utilize the lines of magnetic force.

The armature-poles N S have crescent-shaped extensions, circumferentially of the field, to properly distribute the attractive force between the field-coils and the magnetic poles, and thus to insure a more even rotative force. Said bolts 9 conveniently pass through the overlapping pole-extensions.

In addition to the armature A $A^2$, and a pulley P or its equivalent for transmitting or utilizing the power of the motor, the armature-shaft A' carries a pair of sleeves I and $I^2$, of insulating material, provided with circumferential contact-rings $r$ $r^2$ and $r^3$, each of which is constructed with a pair of peripheral V-shaped grooves; and contact-springs $s$ $s^2$ $s^3$, corresponding with said contact-rings, are attached through the medium of insulating blocks $i'$ and $i^2$ to the standards of said frame-casting; their flat contact-ends being longitudinally divided, and each division making two contacts with the respective sides of each V-shaped groove. A clean electrical contact is thus preserved between each contact-spring and the contact-ring taking the current therefrom or in contact therewith. Binding-posts $p$ $p^2$ $p^3$ at the lower ends of said contact-springs provide for connecting them with the external circuit-wires as hereinafter described.

The contact-rings $r$ $r^2$ on the sleeve I are permanently connected with the respective ends of the armature-coils 10. The contact-ring $r^3$ at the other end of the motor is connected by an insulated conductor to a brush B on one side of the armature-shaft A', which brush is what is known as the insulated brush of the pair when only two brushes B $B^2$ are employed as in Fig. 2; the opposite brush being electrically connected through the shaft A' and frame-casting E, and a binding-post $p^4$ on the latter, with the external circuit-wires.

In the improved arrangement shown in Fig. 1, there are at least three brushes, B $B^2$ $B^3$, a brush or brushes at B being opposed by a pair of brushes $B^2$ $B^3$ on the opposite side of the shaft, so that the brushes are not exactly diametrically opposite each other, and a lead in either direction is automatically obtained in reversing the motor, which insures a quick response of the motor to the reversing key, and prevents possible sparking. Said brush $B^2$ in this arrangement, Fig. 1, is insulated from the shaft A', and electrically connected with an insulated end-contact $q$ carried by the shaft at its adjacent end and electrically connected by an end contact-spring $s'$ to a last post $p'$. The commutator and brushes, in either arrangement, are preferably of the peculiar construction shown in Fig. 2; that is to say the brushes are held, within radial brush-holders H $H^2$, by their outer ends, and are so bent and sprung as to press against the commutator near the shaft, substantially perpendicular to the face of the commutator segments; and this face is made dished or concave, so that as the brushes are thrown outward by centrifugal force the brushes will preserve a clinging contact however great the speed may be. This construction serves also to automatically take up wear in the brushes and segments, or to compensate for such wear. The motor being electrically controlled, its manipulation is effected by a starting bar or starting key in connection with a reversing bar or reversing switch and an arrangement of circuits, as diagrammatically represented by Fig. 5. The working current enters at posts $a$ and $b$, and is led from one post, $b$, to the outer of the main contact-points $c$ and $c^7$ of the reversing switch, which has seven such points arranged in two arcs, with the middle point $c^4$ common to both. The other post, $a$, of said pair of posts $a$ $b$, is directly connected with this middle point $c^4$, and by way of a resistance-coil $x$ with safety points $c^3$ and $c^5$ on the respective sides of said middle point; while said post $b$ is likewise connected through the medium of a resistance-coil $x^2$ with safety-points $c^2$ and $c^6$ next to said outer contact-points $c$ and $c^7$. The reversing switch further comprises an additional pair of contact-points $d$ $d^2$ in another arc, and three swinging arms $e$, $e^2$ and $f$, pivoted respectively at the centers of the arcs in which the three series of contact-points are arranged, and connected with each other, by a handle bar $g$ of insulating material for example, so as to move in unison.

The starting key comprises an upper spring-bar $h$ of metal provided with an actuating knob $h'$ of insulating material, an under spring-bar mechanically connected with said upper bar by blocks $j$ $j^2$ of insulating material, and having three electrical contacts $k$ $k^2$ $k^3$, the former, $k$, for said upper bar $h$, and the other two, $k^2$ and $k^3$, for the under bar $i$, for the purpose of directing the working current. Wires lead from the pivots of the arms $e$ $e^2$ of the reversing switch to said binding posts $p$ and $p^2$ for the armature-coils of the motor, and their circuit is completed when said arms $e$ and $e^2$ are shifted in either direction, first by way of resistance-coils $x$ and $x^2$, and then directly with the posts $a$ and $b$, through the connections of the contact-points $c$ to $c^7$ above described. A wire leads from the pivot of said arm $f$ of the reversing switch to said under bar $i$ of the starting key; from the upper bar $h$ of the starting key a wire leads to the motor post $p^3$ which is electrically connected with the brush B on one side of the armature shaft A' as above; to the upper-contact $k$ of the starting-key a wire leads from said post $a$ by way of the resistance-coil $x$; from the first under-contact $k^2$ of the key a wire leads through the resistance-coil $x^2$ to said post $b$, and from its second under-contact $k^3$ a wire leads direct to said post

*b*. From the posts $p^4$ and $p'$, electrically connected with the opposite brushes $B^2$ and $B^3$, in the three-brush arrangement, Fig. 1, wires lead to the contact-points $d$ and $d^2$ of the reversing switch. From the single opposing brush $B^2$ in the two-brush arrangement, Fig. 2, the connection is preferably by way of the armature-shaft, frame-casting and post $p^4$ as dotted in Fig. 5. When the switch-arms are in the positions represented in the diagram, the motor is at rest. Now by pressing upon the knob $h'$ of the starting key, and holding it down, as by the pressure of one of the hands or feet of the person in charge, and moving the switch arms $e\ e^2$ and $f$ one point either way, the motor will rotate in the direction indicated by the switch. To reverse the direction of rotation, the starting key is re-elevated, and the reversing switch is brought back to the neutral position in which it is shown in the diagram, and then along to its opposite working position; the starting key being again closed.

It will be understood that no attempt is made to represent the correct proportions, arrangement, and mechanical and electrical details of the devices diagrammatically shown in Fig. 5. In practice I propose to have suitable mechanical devices arranged to accomplish the commutations properly in unison or proper rotation and may replait the combination of circuits and switches above described in modified arrangements embodying the same principle and substantially the same mode of operation.

The armature-sections $A$, $A^2$, may as heretofore suggested be parallel or in line with one another in some cases, and may be simply keyed fast to their shaft $A'$; or one section or the armature coils may be omitted; the bed-plate and bearings may in some cases be made in two or more parts; the commutator sections may be more or less concave or may be flat in small motors; the brushes may be provided with small weights as represented by dotted circles at $w$ in Fig. 2 to increase their inertia; in the three-brush arrangement, the brush $B^3$ as well as the brush $B^2$ may if desired have an insulated circuit, comprising a contact-ring $r^4$ and a contact-spring $s^4$, as represented in Fig. 5, its post $p^4$ being in this case insulated from the frame-casting of course; and other like modifications will suggest themselves to those skilled in the art.

Having thus described the said improved motor, I claim as my invention and desire to patent under this specification—

1. In an electric motor, a fixed drum-shaped field-ring having an odd number of coils exceeding by at least three the number of the armature-poles and electrically connected in series, in combination with a bipolar armature rotating within said field-ring and having crescent-shaped pole-extensions, substantially as hereinbefore specified.

2. In the fixed field-ring, the combination with the insulated iron-wire winding of annular side-pieces of any material having external lugs, and bolts, external to the winding, connecting said side-pieces with each other.

3. The combination with the frame-casting of a fixed drum-shaped field-ring having a core circumferentially wound with insulated iron wire, annular core-pieces forming the lateral boundaries of the winding space or spaces and having external lugs, and bolts extending through said lugs external to said winding or windings, and serving to connect said side-pieces with each other and to attach the field-ring to said frame-casting.

4. In an electric motor, a bipolar armature composed of two or more sections, side by side, rigidly united with each other and with the armature-shaft, constructed with crescent-shaped pole-extensions, and arranged one partly in advance of the other, circumferentially of the field.

5. The combination, substantially as hereinbefore specified, of a dished or concave fixed commutator, and revolving brushes which contact with the commutator-segments toward the center of the commutator, when at rest, and yield radially when in motion, substantially as hereinbefore specified.

6. The combination with a reversing switch, its contacts and electrical connections, and with a suitable commutator, of three brushes coacting with said commutator, two of the brushes being of one and the same polarity and the other of the opposite polarity, substantially as hereinbefore specified.

7. The combination with a bipolar armature and its shaft, a fixed field-ring, and a fixed commutator, of a revolving brush on one side of the shaft, two such brushes on the opposite side of the shaft, one in advance of the other, and independent insulated circuits for each brush, substantially as hereinbefore specified.

8. In combination with the armature shaft and with an insulated contact ring carried thereby and constructed with circumferential V-shaped grooves, a stationary contact spring having a flat contact end longitudinally divided and making a double contact with the sides of each of said grooves, substantially as hereinbefore specified.

9. The combination with the armature-shaft and with revolving brushes carried thereby, as hereinbefore specified, of a central contact in one end of said shaft, insulated therefrom and electrically connected with one of said brushes, and a stationary contact-spring electrically connected with one of the binding-posts of the motor.

10. The combination with the armature coils of a reversing switch comprising swinging arms electrically connected with said coils respectively, a double series of contact points arranged in two arcs beneath said arms and comprising safety-points on both sides of each working contact, and working circuits including resistances in circuit with said safety-points, substantially as hereinbefore specified.

11. The combination of the fixed field-coils and revolving armature-coils having independent circuits, the fixed commutator and revolving brushes, the reversing switch and starting key, and circuits controlled by said key and switch leading to the armature-coils and to the brushes, substantially as hereinbefore specified.

12. The combination, substantially as hereinbefore specified, of a fixed field-ring wound in series, a bipolar armature independently wound in series, an armature-shaft provided with a pair of insulated contacts electrically connected with the armature-coils, a fixed commutator the segments of which are electrically connected with the respective field-coils, two or more revolving brushes carried by said armature-shaft, contact-springs coacting with said armature-contacts, a reversing switch electrically connected with these contact-springs and with the brush or brushes at one side of the shaft, and a starting key electrically connected with the other brush and with said reversing switch.

13. In combination with a fixed field-ring wound in series, and with a bipolar armature independently wound in series, an armature-shaft carrying insulated contacts two of which are electrically connected with the respective ends of the armature-coils, three revolving brushes carried by said armature-shaft, and an electric circuit the respective legs of which are connected with said armature-contacts, while one leg thereof is connected with one of said brushes and the other leg with one or the other of the second and third brushes according to the direction of rotation, substantially as hereinbefore specified.

ABRAHAM V. MESEROLE.

Witnesses:
HUGH P. BURK,
E. H. MOSELEY.